(12) United States Patent
Tkachyk (10) Patent No.: US 8,485,770 B2
(45) Date of Patent: Jul. 16, 2013

(54) AGITATING DEVICE FOR A GRAIN BIN DISCHARGE OPENING

(76) Inventor: Ted F. Tkachyk, Elm Creek (CA)

( * ) Notice: Subject to any disclaimer, the term of this patent is extended or adjusted under 35 U.S.C. 154(b) by 436 days.

(21) Appl. No.: 12/753,943

(22) Filed: Apr. 5, 2010

(65) Prior Publication Data

US 2010/0254790 A1 Oct. 7, 2010

(30) Foreign Application Priority Data

Apr. 6, 2009 (CA) .................................. 2660901

(51) Int. Cl.
*B65G 65/00* (2006.01)

(52) U.S. Cl.
USPC .......................................... 414/311; 222/234

(58) Field of Classification Search
USPC ................. 414/311, 310, 808, 306, 287, 133, 414/288, 291, 304, 305, 312, 313, 317, 318, 414/319, 321; 366/347, 346, 193; 241/274, 241/94, 98, 283; 222/200, 243, 244, 189.05, 222/196, 197, 199, 216, 220, 226, 233, 234; 52/192, 197; 198/736, 737, 747

See application file for complete search history.

(56) References Cited

U.S. PATENT DOCUMENTS

| | | | | |
|---|---|---|---|---|
| 1,466,835 | A | | 9/1923 | Jennings |
| 1,584,721 | A | * | 5/1926 | Bland .............................. 241/26 |
| 1,913,767 | A | * | 6/1933 | Mills .............................. 141/369 |
| 2,490,520 | A | * | 12/1949 | Hazard .......................... 209/357 |
| 2,726,792 | A | * | 12/1955 | Seymour ....................... 222/199 |
| 2,902,189 | A | | 9/1959 | Buhrer |
| 3,237,788 | A | * | 3/1966 | Weaver et al. ................. 414/307 |
| 3,592,150 | A | * | 7/1971 | Lanyon et al. ................. 588/321 |
| 3,972,449 | A | * | 8/1976 | Smith .............................. 222/64 |
| 4,043,488 | A | * | 8/1977 | Halvorsen et al. ............. 222/233 |
| 4,157,761 | A | * | 6/1979 | Debor ........................... 414/304 |
| 4,217,701 | A | * | 8/1980 | Mathews ......................... 34/211 |
| 4,363,586 | A | * | 12/1982 | Gessler et al. ................ 414/325 |
| 4,445,282 | A | * | 5/1984 | Heinemans ..................... 34/168 |
| 4,451,192 | A | * | 5/1984 | Wood ............................ 414/306 |
| 4,618,304 | A | * | 10/1986 | Finger ............................ 414/306 |
| 4,731,179 | A | * | 3/1988 | De Baere ....................... 210/251 |
| 4,763,777 | A | * | 8/1988 | Hooper et al. ................. 198/747 |
| 4,805,762 | A | * | 2/1989 | Hooper et al. ................. 198/747 |
| 4,957,404 | A | | 9/1990 | Lepley |
| 5,375,342 | A | * | 12/1994 | Giesler ........................... 34/168 |
| 5,975,447 | A | | 11/1999 | Brusseau |
| 6,497,545 | B1 | | 12/2002 | Simrose |
| 7,207,431 | B1 | * | 4/2007 | Singleton ....................... 198/498 |
| 2008/0131242 | A1 | | 6/2008 | Duffy et al. |

FOREIGN PATENT DOCUMENTS

CA 2236645 11/1999

* cited by examiner

*Primary Examiner* — James Keenan
*Assistant Examiner* — Glenn Myers
(74) *Attorney, Agent, or Firm* — Ryan W. Dapuis; Kyle R. Satterthwaite; Ade & Company Inc.

(57) ABSTRACT

The agitating device is a moveable safety grate designed mainly for use in grain and material handling bins. The grate creates a safe and easy way to break up any lumps created in the grain or material during storage which would impede the flow to the grain sump. The safety bars may comprise width adjustable safety bars which are mounted on rails to move and reciprocate freely at the central opening of the grain sump in the bin floor. The grate can be moved via a rod protruding to the exterior of the bin, or by an optional air cylinder with air lines running to controls on the exterior of the bin. To aid in breaking up of lumps, the grate may also be equipped with a collapsible metal slat which is attached to the sliding grate and can be collapsed when the bin sweep is in use.

19 Claims, 7 Drawing Sheets

FIG. 6

AGITATING DEVICE FOR A GRAIN BIN DISCHARGE OPENING

This application claims foreign priority benefits from Canadian Patent Application 2,660,901 filed Apr. 6, 2009.

FIELD OF THE INVENTION

The present invention relates to an agitating device for use in a particulate material storage bin, for example a grain bin, wherein the bin comprises a bin floor, a discharge sump below the bin floor, and a central discharge opening in the bin floor in communication with the discharge sump and wherein the device comprises a grate member arranged to reciprocate across the discharge opening.

BACKGROUND

Grain and material bins are equipped with stationary bars covering a sump which is where the unloading system allows product to be removed from the bin. These bars are there to reduce the chance of injury or death caused by contact with the running unloading system. When a lump of grain or product forms in the bin, the flow to the sump and unloading system can be reduced or stopped completely. Once this occurs, it is very difficult and dangerous to break up the lumps and restore full grain and material flow.

U.S. Patent Application Publication U.S. 2008/0131242 discloses a grain bin discharge guard supported over the inner end of a sweep auger at the central discharge opening in the bin floor. The guard member comprises a cage surrounding the inner end of the sweep auger and which rotates together with the sweep auger to break up compacted grain at the discharge opening. The guard member is only movable for rotation together with the sweep auger so that the guard member cannot provide any agitation of compacted grain when the sweep auger is not in operation during the initial unloading stage of the grain bin when compaction of grain is of greater concern.

SUMMARY OF THE INVENTION

According to one aspect of the invention there is provided an n agitating device for a particulate material storage bin comprising a bin floor, a discharge sump below the bin floor, and a central discharge opening in the bin floor in communication with the discharge sump, the agitating device comprising:

a grate member comprising a plurality of spaced apart bars fixed relative to one another;

a pair of rails arranged to be supported along opposing sides of the discharge opening in the bin floor;

the rails being arranged to support the grate member such that the grate member is slidable along the rails between a first position substantially spanning across the discharge opening and a second position substantially spanning across the discharge opening at a location spaced along the rails from the first position; and an actuator being arranged to reciprocate the grate member between the first and second positions thereof.

The agitating device of the present invention allows movement of the safety bars covering the sump in order to safely loosen these lumps and crusts which are impeding the flow of material to the unloading system. This design is created to replace existing stationary safety bars or to be placed in bins which are not equipped with safety bars over the sump. The safety bars are mounted on a set of rails which allow the unison movement of all bars while still maintaining an appropriate opening to the sump. This configuration of the agitating device allows agitation of grain at the discharge opening in the bin floor independently of the operation of the sweep auger throughout the unloading of a grain bin.

When used with a bin comprising a discharge sump including a discharge auger extending in a longitudinal direction below the bin floor, preferably the rails are arranged to support the grate member for sliding movement in the longitudinal direction of the discharge auger.

The rails are preferably arranged to support the grate member below an uppermost surface of the bin floor in both the first and second positions.

Preferably the rails are arranged to support the grate member such that the bars extend transversely to a sliding direction of the grate member between the first and second positions thereof.

The grate member may comprise a pair of side members extending in a sliding direction of the grate member along opposing sides of the grate member in sliding engagement with the pair of rails respectively in which the bars of the grate member extend between the side members.

When each rail comprises an upper flange and a lower flange receiving a respective side edge of the grate member therebetween for relative sliding movement, preferably the lower flange is shorter than the upper flange in a sliding direction of the grate member.

There may be provided a fixed bar arranged to span across the discharge opening in proximity to a first end of the discharge opening such that the grate member is arranged to overlap the fixed bar in the first position and is arranged to be spaced from the fixed bar towards a second end of the discharge opening opposite the first end in the second position.

When the bars of the grate member are arranged to span across the discharge opening between opposing side edges of the grate member supported on pair of rails respectively, the bars of the grate member may be adjustable in length such that a width of the grate member between the rails is adjustable.

Preferably there is provided one or more protrusion members supported on the grate member so as to be arranged to extend upwardly from the grate member beyond an uppermost surface of the bin floor.

When used with a bin comprising a sweep auger supported above the bin floor to gather particulate material towards the discharge opening, the protrusion member or members may be supported on the grate member such that the sweep auger is arranged to rotate past the protrusion member.

The protrusion member may be supported on the grate member such that the protrusion member is movable between a working position extending upwardly from the grate member where the member is held in place by a pin and a sweep position lowered in relation to the working position to lay flat against the grate member such that the sweep auger is arranged to rotate past the protrusion member in the sweep position.

Preferably the actuator is coupled to the grate member by a coupling which is selectively releasable to permit the actuators to be serviced independently of the grate member.

Preferably the actuator is arranged to be supported below the bin floor.

In one embodiment the actuator comprises a pair of actuator members coupled to grate member at laterally spaced apart positions adjacent respective ones of the rails.

Preferably the actuator members are coupled to the grate member opposite the discharge auger.

The actuator members may comprise air controlled piston cylinders coupled to the grate member and supported below the bin floor. The actuator members are preferably controlled by a common controller arranged to be supported externally of the bin such that the actuator members are in communication with the common controller by air lines extending below the bin floor.

In an alternatively embodiment, the actuator comprises an elongate actuator member arranged to extend in a sliding direction of the grate member between the grate member and an external handle arranged to be supported externally of the bin. The external handle allows an operator to manually reciprocate the grate member.

There may be provided a retrofit frame member arranged to be received in the discharge opening in the bin floor in place of an existing safety grate spanning the discharge opening in a bin floor. Preferably the rails are supported along opposing sides of the retrofit frame member such that the grate member is supported on the retrofit frame member for relative sliding movement.

The actuator is also preferably supported on the retrofit frame member. A cover member may be arranged to be supported on the retrofit frame member such that the cover member spans over the actuator substantially flush with the bin floor and such that the cover member is readily removable independently of the grate member for access to the actuator.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a storage bin discharge opening agitating device generally indicated by reference numeral 10. The agitating device 10 is typically arranged for use with a particulate material storage bin 12, for example a grain bin.

Although various embodiments of the agitating device 10 are described and illustrated herein, the common features of the various embodiments will first be described.

A common bin construction with which the device 10 is suited comprises a foundation 14 which supports a cylindrical bin wall 16 extending upwardly therefrom to a roof of the bin. A bin floor 18 is spaced above the foundation and spans horizontally across the bottom end of the bin to be joined with the bin wall 16. A central discharge opening 20 is provided in the horizontal bin floor 18 for communication with a discharge sump below the bin floor. The sump includes a trough 22 extending from an inner end wall 24 at the inner end centrally located in the bin to an exterior of the grain bin. A discharge auger 26 extends in the longitudinal direction of the sump for discharging grain in the bin from the discharge opening 20 through the sump to the exterior of the bin. A sweep auger 28 is supported above the bin floor to extend radially from an inner end coupled to a motor 30 to an outer end at the peripheral wall of the bin. In other instances a gearbox is supported centrally in the bin for transferring drive from the sump auger to the sweep auger in place of the motor 30.

The motor or gearbox 30 is supported on a deck 32 which extends horizontally from the top end of the inner end wall of the sump partway across the discharge opening 20 in the floor such that the deck is recessed below the floor and supports the motor or gearbox 30 centrally thereon at the center of the bin. The sweep auger gathers particulate material in the bin towards the central discharge as the sweep auger rotates above the bin from a central axis of the motor.

In, prior art configurations, a fixed safety grate is typically flush-mounted with the bin floor to span across a portion of the discharge opening which overlaps the sump area while the discharge opening remains open above the deck 32 such that the motor or gearbox 30 of the sweep auger extends upwardly therethrough. The agitating device 10 of the present invention is arranged to replace the fixed safety grate of the prior art to provide agitation to compacted material in the bin while also providing the function of the safety grate to partially block access to the sump auger below the discharge opening in the bin floor.

The device 10 typically comprises a retrofit frame member 40 defining a rectangular perimeter of the device 10 arranged to be received within the discharge opening such that the frame member extends about the periphery of the opening. The frame member includes two side members 42 extending along opposing sides of the frame member in the longitudinal direction thereof between two end members 44 spanning in a lateral direction across opposing ends of the frame. Each of the side members and end members 42 and 44 comprise an upright flange spanning a height of a frame member and a horizontal flange 46 extending horizontally outward from a top end of the respective upright flange. The horizontal flange 46 serves to mount the frame member substantially flush with the bin floor either in recessed relation with the bin floor or in an overlapping configuration with the bin floor. The horizontal flange 46 includes apertures therein at spaced positions about the periphery for receiving suitable bolts for anchoring the frame member in fixed relation to the bin floor.

The frame member 40 extends in a longitudinal direction between a first end 48 and a second end 50. The frame member is arranged to be mounted such that the longitudinal direction of the two side members 42 are aligned in the longitudinal direction of the sump auger with the first end 48 being mounted adjacent the auger to overlap the sump area. The second end of the frame member is positioned opposite the sump auger to overlap the deck 32 supporting the sweep auger motor 30 thereon such that the motor extends upwardly through the frame member in the mounted position of the frame member in the bin floor. The end wall of the sump is arranged to be approximately centered in the longitudinal direction between opposing first and second ends of the frame member.

The device 10 further comprises a grate member 52 which is supported on the frame member 40 for relative sliding movement between respective first and second horizontally spaced apart positions. The grate member is supported on a pair of rails 54 which are mounted along opposing side members 42 of the frame member such that the rails extend in the longitudinal direction.

Each of the rails 54 spans from a central location on the frame member near the end wall of the sump to the first end of the frame member overlapping the sump area. Each rail comprises an upper flange 56 extending horizontally a full length of the rail 54 from the end wall of the sump area to the first end of the frame member. Each rail further comprises a lower flange 58 which is parallel to and spaced below the upper flange to define a channel space or track therebetween which receives a respective side edge of the grate member 52 therein such that the grate member is slidable in the longitudinal direction between the first and second positions thereof.

The lower flange 58 of each rail is shorter in the longitudinal direction than the upper flange such that each of the opposed ends of the lower flange terminate at a location spaced inwardly from the corresponding end of the upper flange which extends in the longitudinal direction above the lower flange. In this arrangement a gap is maintained between the ends of the lower flange 58 and the first end of the frame member to ensure that both ends of the tracks defined between the upper and lower flanges of the rail remain open to prevent trapping particulate material within the tracks which would otherwise interfere with the relative sliding movement of the grate member.

Typically one of the grate member or the rails includes a low friction material supported or coated thereon to reduce friction while the grate slides between the first and second positions thereof.

The grate member 52 typically comprises two side members 60 extending along opposing sides of the grate member along the full length thereof in the longitudinal direction. A plurality of rigid bars 62 span in the lateral direction perpendicularly to the longitudinal sliding direction of the grate member such that each bar extends horizontally between opposing ends fixed onto the respective ones of the side members 60 of the grate member. The bars 62 are supported at an even and equal spacing therebetween in the longitudinal direction such that all of the rigid bars remain in a generally common plane which is substantially flush or recessed below the bin floor throughout the movement thereof between the first and second positions. The space between each adjacent pair of bars corresponds to a prescribed safety space which limits access to the auger in the sump area, for example a space of approximately two inches.

The device 10 further comprises a fixed bar 64 extending between the two side members 42 of the frame member in proximity to the first end thereof so as to be spaced from the first end by a space corresponding to the prescribed safety space of the rigid bars 62 of the grate member.

The rails 54 support the grate member 52 such that the bars remain below an uppermost surface of the bin floor. In the first position, the grate member is spaced horizontally from the first end of the frame member and spaced horizontally from the fixed bar such that the space between the rigid bar 62 at the end of the grate member and the fixed bar corresponds to the prescribed safety space noted above. In the second position, the grate member is displaced towards the first end such that the grate member overlaps the fixed bar which is lower in elevation than the grate member with the end of the grate member engaging the first end of the frame member so that the rigid bar 62 of the grate member which is adjacent to the last bar at the end of the grate member is in alignment with the fixed bar in the second position.

The grate member has a length in the longitudinal direction which is sufficient to fully span the area of overlap of the discharge opening with the sump area below the opening. An inner end of the grate member is positioned in proximity to the end wall in the second position while overlapping the deck area of the sweep auger motor in the first position where the grate member is spaced towards the second end of the frame relative to the second position.

To provide additional agitation, a protrusion member 66 is provided on the grate member in the form of a flat bar which is coupled to the grate member at the bottom end and which extends upwardly therefrom to a top end which is positioned above the uppermost surface of the bin floor. In the illustrated embodiment the protrusion member is hinged on a horizontal post for pivotal movement about a horizontal axis between a working position extending vertically upward above the bin floor while being retained in the working position by a suitable retainer pin 68 coupled thereto and a sweep position. The protrusion member is moveable from the working position to the sweep position by releasing the pin 68 and pivoting the member into a substantially flat position against the grate member below the sweep auger such that the sweep auger is permitted to sweep past the protrusion member in the sweep position thereof. The protrusion member is laterally offset towards one side of the grate member so as not to interfere with the sweep auger extending over the discharge opening in a starting position of the auger.

In alternate configurations a plurality of separate protrusion members 66 are independently mounted on the grate member to extend generally upward therefrom. The protrusion members may remain fixed in relation to the grate member by providing protrusions which extend upwardly above the bin floor but remain below the sweep auger so that the auger can still rotate past the protrusion member in operation.

In further embodiments, each of the bars of the grate member may be telescopic and adjustable in length. In this manner, the width of the grate member spanning between the rails of the device is readily adjustable relative to the discharge opening into which the grate member can be retrofit.

In all embodiments an actuator 70 is provided in connection with the grate member for reciprocating the grate member between the first and second positions thereof. Typically, the actuator 70 extends below the bin floor for connection to the grate member from below.

Figure 1:
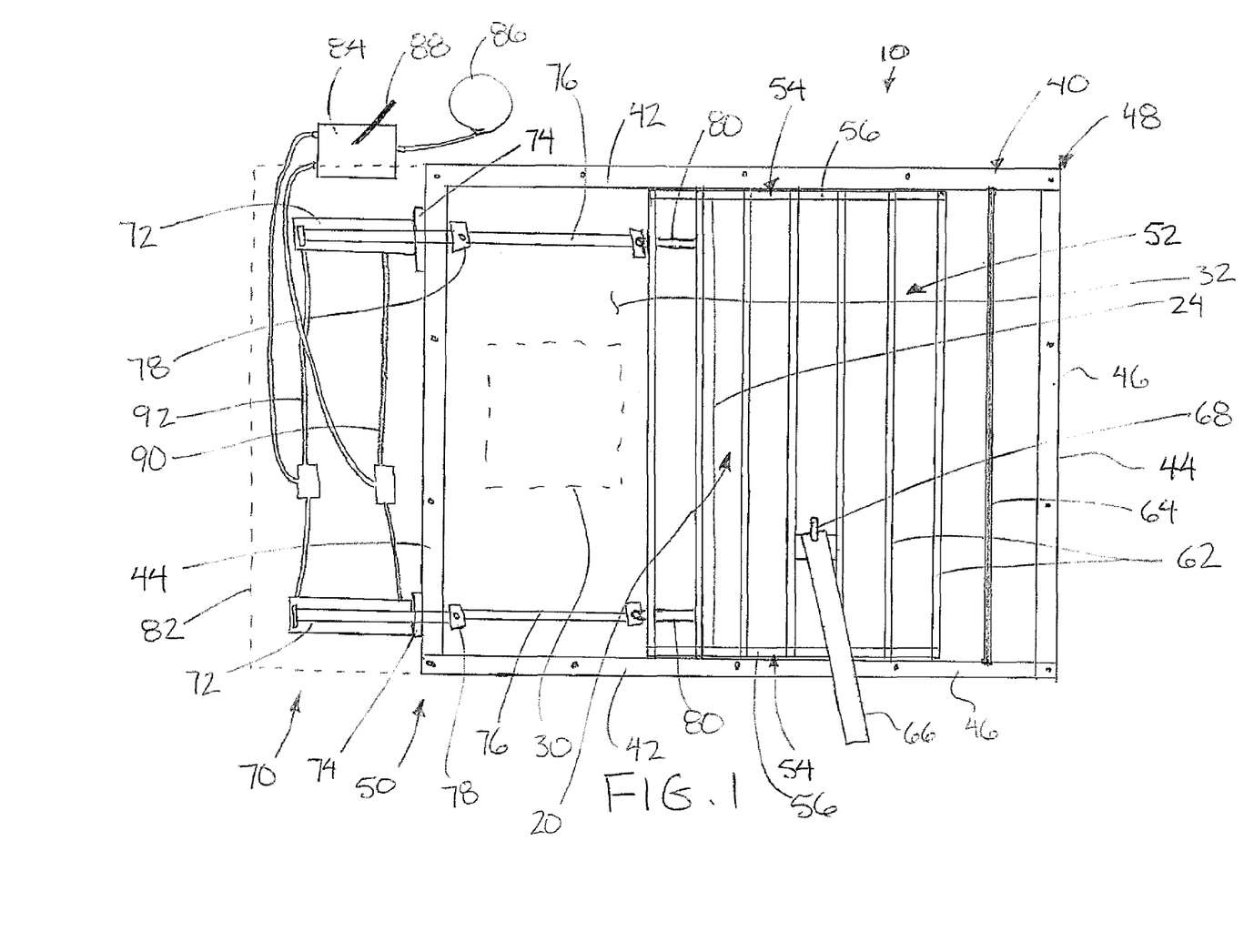
FIG. 1 is a top plan view of a remotely operated first embodiment of the agitating device in a first position of the grate member.
Figure 2:
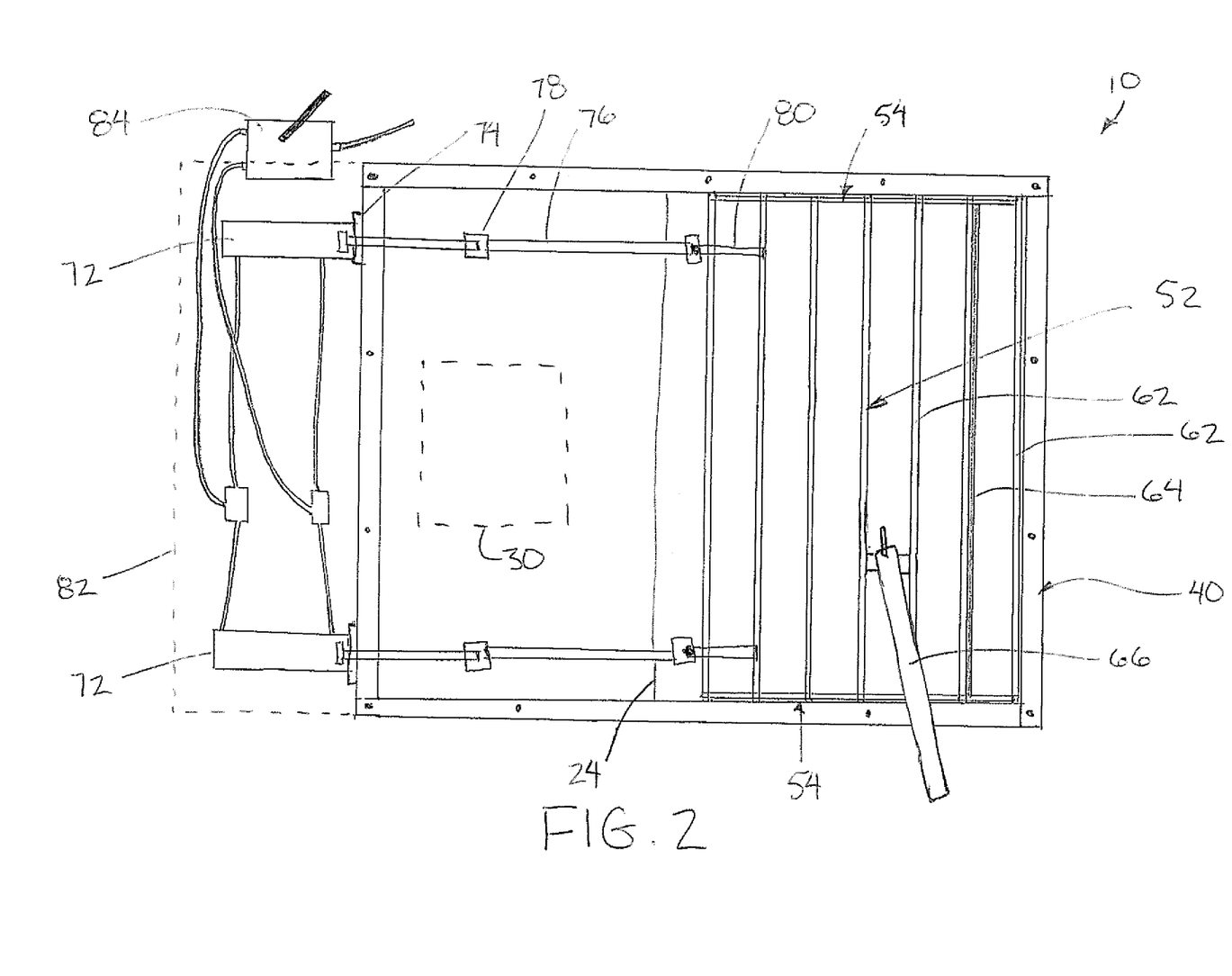
FIG. 2 is a top plan view of the first embodiment of the agitating device in a second position of the grate member.
Figure 3:
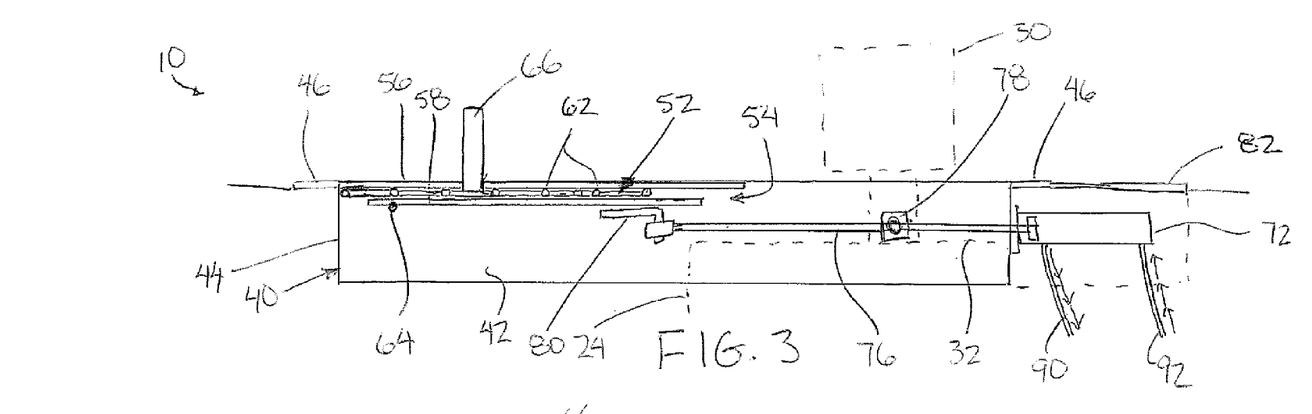
FIG. 3 is a partly sectional side elevational view of the first embodiment of the agitating device in the second position of the grate member.
Figure 4:
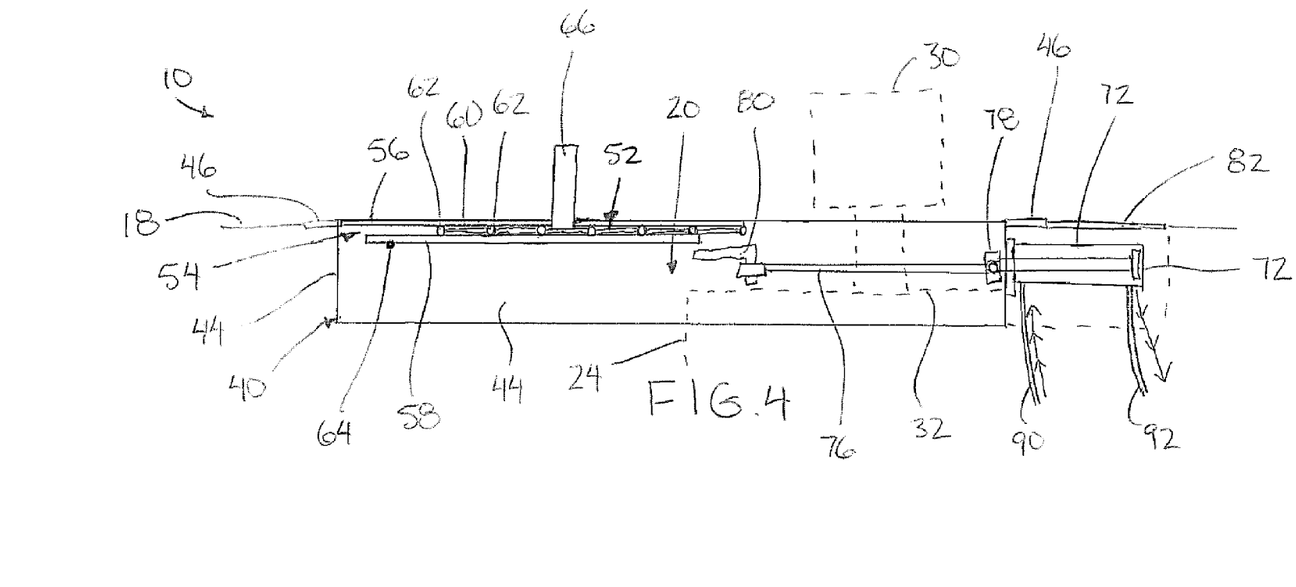
FIG. 4 is a partly section side elevational view of the first embodiment of the agitating device in the first position of the grate member.
Figure 9:
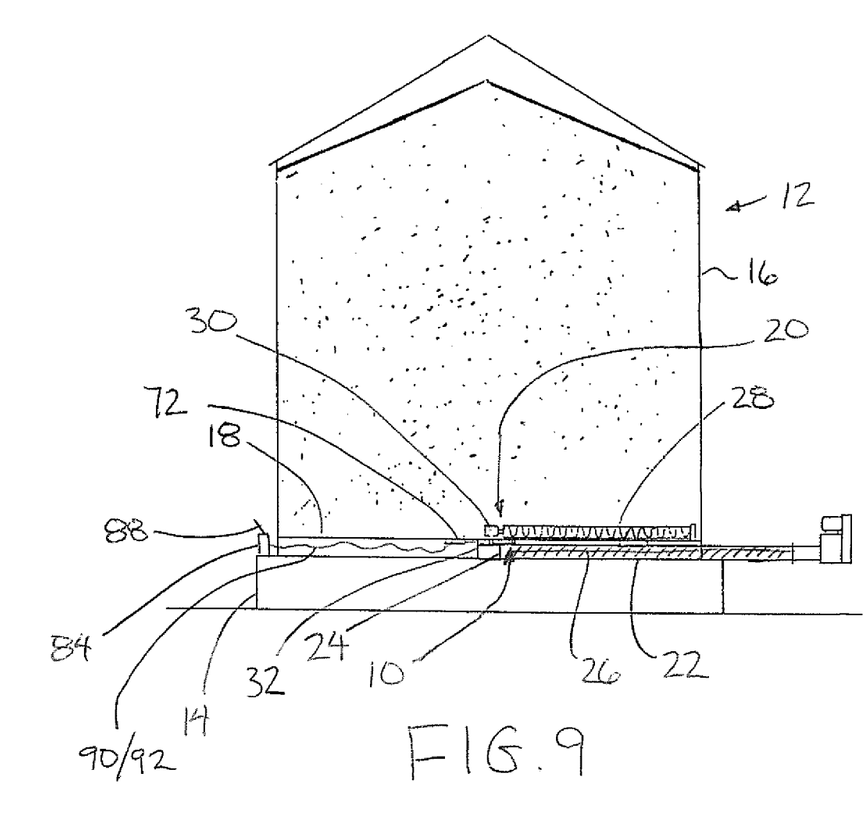
FIG. 9 is a partly sectional side elevational view of a grain bin supporting the first embodiment of the agitating device thereon.

Turning now to the first embodiment show in FIGS. 1 through 4 and FIG. 9, the actuator 70 in this instance comprises two actuator members 72 which each comprise an air controlled piston cylinder. Each actuator member 72 includes a cylinder supported by a respective cylinder mount 74 in one of the end members 44 of the frame at the second end thereof opposite the sump auger. The two actuator members 72 are mounted at the end of the frame such that the two actuator members are horizontally spaced apart in a lateral direction which is perpendicular to the longitudinal direction of the sump auger. Each actuator member 72 is thus mounted adjacent a respective one of the side members of the frame to extend along opposing sides of the sweep motor on the deck.

The piston ends of the two actuator members extend through respective apertures in the second end of the frame for connection by a suitable connecting member 76 to the grate. Each connecting member 76 comprises a rod extending in the longitudinal direction between a releasable coupling 78 connected to the piston end of the actuator member and a suitable bracket 80 arranged to be coupled to an adjacent pair of the rigid bars of the grate member. The coupling 78 permits quick release connection of the actuators to the grate member such that the actuator can be disconnected and removed independently of the grate member for servicing.

The two actuator members 72 are typically recessed within the opening in the bin floor while being arranged to be enclosed by a cover member 82. The cover member is typically arranged to be supported by the frame member 40 so as to be substantially flush with the bin floor overtop of the actuator members. The cover member 82 can be released independently of the grate member for providing servicing access to the actuators as may be desired.

Each of the two actuator members 72 is controlled by a common controller 84 which is positioned externally of the grain bin and which permits simultaneous operation of the two actuator members to reciprocate the grate member between the first and second positions thereof. The controller 84 comprises a suitable valve arranged to connect between an air supply 86 and the two actuator members 72. A handle 88 of the controller 84 is operable between a first position and a second position. In the first position the supply of pressurized air is directed through respective first air supply lines 90 to retract the cylinders and displace the grate member to the first position thereof. In a second position, the controller redirects pressurized air from the supply 86 through a set of second supply lines 92 operable to extend the piston cylinders for slidably displacing the grate member into the second position. In each of the two positions, the supply lines opposite to those receiving air from the supply 86 are vented by the valve of the common controller. The first and second air supply lines communicate below the bin floor between the actuator members 72 and the external common controller 84 positioned remotely from the actuators.

Figure 5:
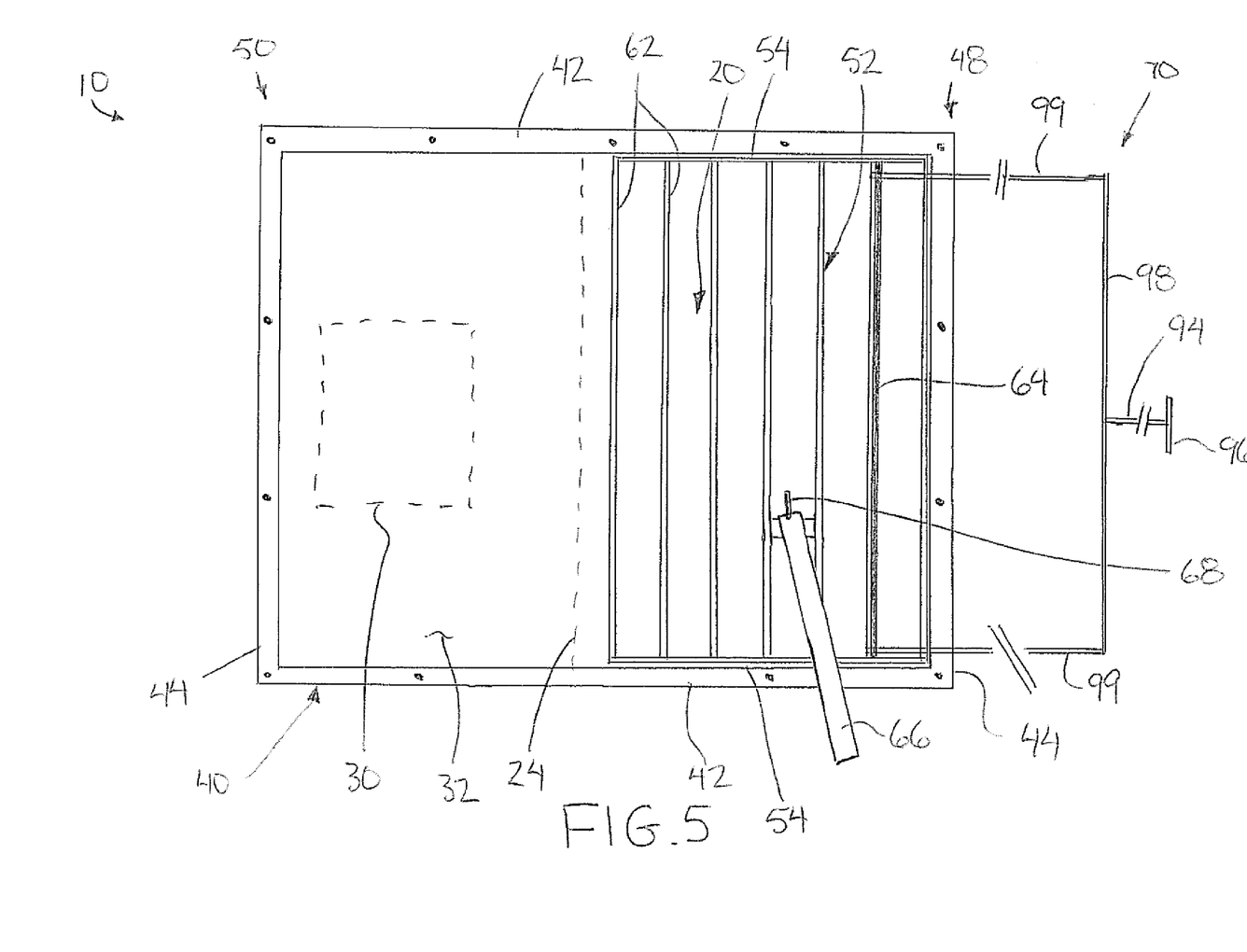
FIG. 5 is a top plan view of a manually operated second embodiment of the agitating device in the second position of the grate member.
Figure 6:
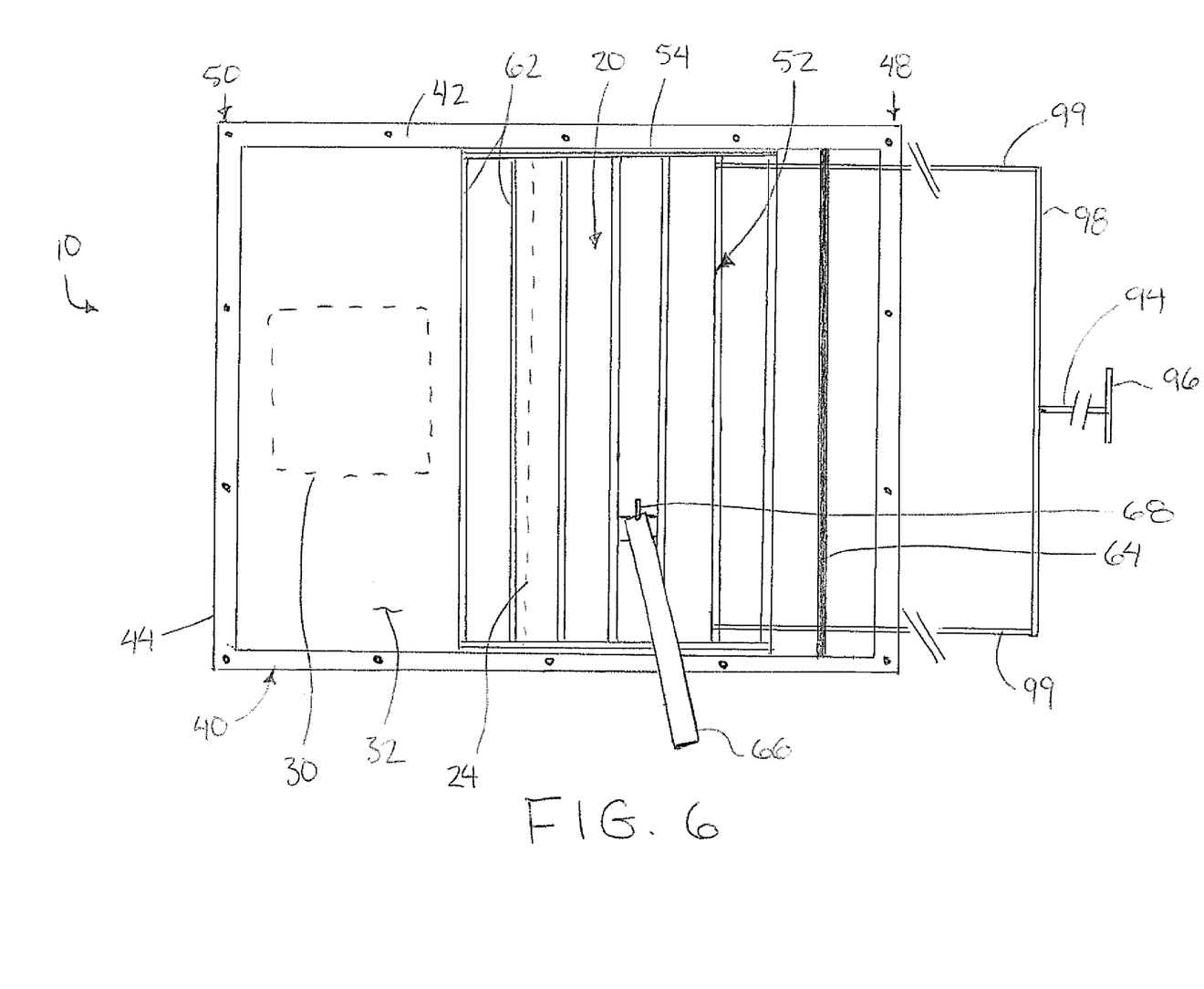
FIG. 6 is a top plan view of the second embodiment of the agitating device in the first position of the grate member.
Figure 7:
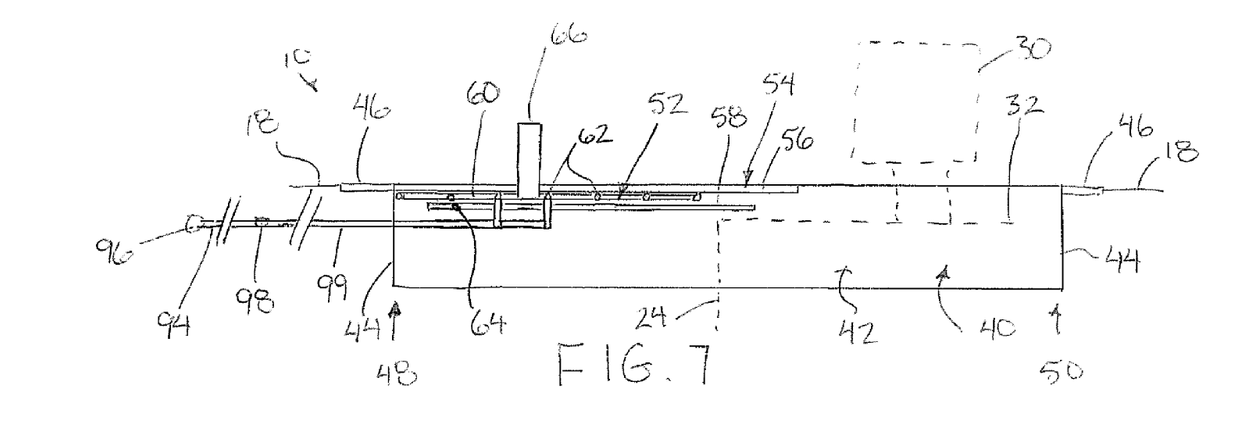
FIG. 7 is a partly sectional side elevational view of the second embodiment of the agitating device in the second position of the grate member.
Figure 8:
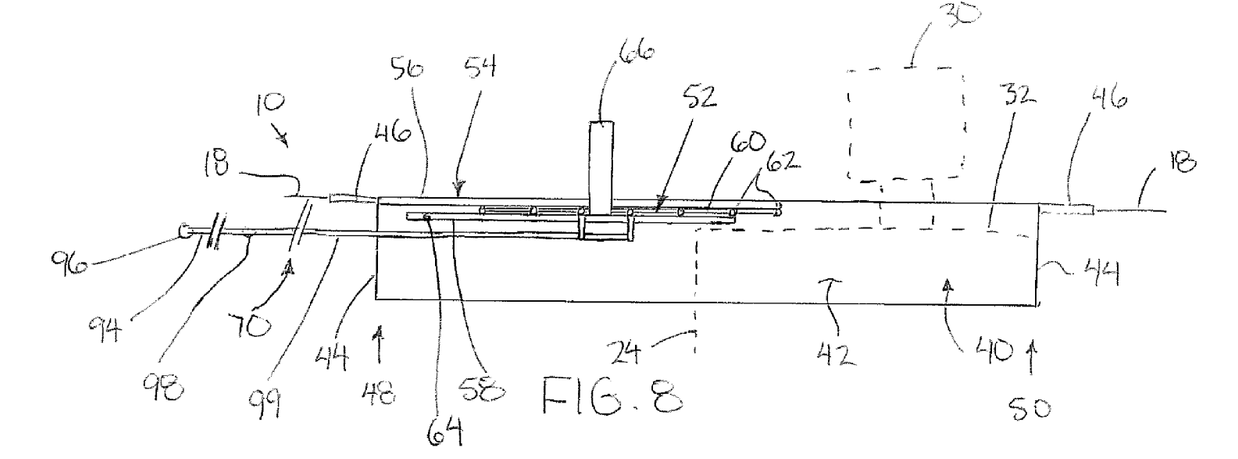
FIG. 8 is a partly sectional side elevational view of the second embodiment of the agitating device in the first position of the grate member.

Turning now to the embodiment of FIGS. 5 through 8, according to a second embodiment of the present invention, the actuator is manually operated and comprises a rod member 94 extending in the longitudinal direction between an exterior handle 96 at an exterior of the bin and a yoke 98 at an inner end comprising two side members 99 which are joined to respective sides of the grate member at laterally spaced apart positions thereon. The two side members 99 extend along opposing sides of the trough 22 of the sump so as to be coupled to an end of the grate member adjacent the first end of the frame member and so as to extend in the direction of the sump auger horizontally below the bin floor to the yoke 98 joined to the rod member 94 at the exterior of the bin. In this instance an operator manually reciprocates the exterior handle 96 to displace the grate member between the first and second positions thereof.

In use according to either embodiment, a grain bin is typically unloaded through the sump auger with the sweep auger being initially stationary. The protrusion members are typically supported in the working position prior to loading of the grain bin such that the protrusions are already in the working position during the unloading of the bin. At any time during the unloading, the grate member can be reciprocated between the first and second positions thereof to break up any compacted grain at the discharge opening. Once the majority of the bin has been unloaded and the sweep auger is to be operated to collect the remainder of the particulate material on the bin floor, the protrusions are lowered into the sweep position. Reciprocation of the grate member in the sweep position of the protrusions is also effective at breaking up compacted grain.

As described above, the safety bars can be slid back and forth on the rails via a metal rod connected to the bars, and protruding to the exterior of the bin. The safety bars can also be moved by an air powered cylinder which has an extension air line and a retraction airline running to an air control valve on the exterior of the bin. The air cylinder is anchored to the mounting frame below the safety bars. The moving end of the cylinder is attached to the safety bars which slide in a back and forth motion on the rails. The extension and retraction of the air cylinder is what creates the movement needed to break up lumps which are reducing material flow. There exists a stationary safety bar which is necessary to maintain adequate fall protection. The safety grate can be made to fit various widths of sumps by varying the lengths of the safety bars. There is a metal slat placed perpendicular to the bars to assist in the breaking up of lumps and crusts. The slat is held upright with a pin which may be removed to enable the slat to lay down flat by way of the metal slat pivot to allow the bin sweep to operate without interference.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agitating device in combination with a bin floor assembly of a particulate material storage bin in which the bin floor assembly includes a bin floor, a discharge sump below the bin floor including a passage extending outwardly from an inner end wall adjacent a center of the bin floor, a central discharge opening in the bin floor in communication with an inner end of the passage of the discharge sump, a discharge auger extending through the passage so as to be arranged to convey material from the central discharge opening to an exterior of the storage bin, and a sweep auger supported above the bin floor and arranged to gather particulate material towards the discharge opening, the agitating device comprising:

a grate member comprising a plurality of spaced apart bars fixed relative to one another;
  a frame mounted in the discharge opening of the bin floor assembly, the frame including a pair of rails arranged to be supported along opposing sides of the discharge opening in the bin floor;
  the rails supporting the grate member on the bin floor assembly such that the grate member is slidable generally horizontally along the rails between a first position substantially spanning across the discharge opening and a second position substantially spanning across the discharge opening at a location spaced along the rails from the first position;
  an actuator being arranged to reciprocate the grate member between the first and second positions thereof;
  at least one protrusion member supported on the grate member so as to be movable between a working position extending upwardly from the grate member beyond an uppermost surface of the bin floor and a sweep position in which the protrusion member does not interfere with rotation of the sweep auger across the bin floor past the protrusion member;
  and a retainer member arranged to selectively retain said at least one protrusion member in the working position.

2. The agitating device according to claim 1 wherein the frame is mounted in the discharge opening of the bin floor assembly so as to be substantially flush with the bin floor and the rails support the grate member on the bin floor assembly below an uppermost surface of the bin floor.

3. The device according to claim 1 wherein the rails are arranged to support the grate member for sliding movement in a longitudinal direction of the discharge auger.

4. The device according to claim 1 wherein the rails are arranged to support the grate member such that the bars extend transversely to a sliding direction of the grate member between the first and second positions thereof.

5. The device according to claim 1 wherein the grate member comprises a pair of side members extending in a sliding direction of the grate member along opposing sides of the grate member in sliding engagement with the pair of rails respectively, the bars of the grate member extending between the side members.

6. The device according to claim 1 wherein each rail comprising an upper flange and a lower flange receiving a respective side edge of the grate member therebetween for relative sliding movement, the lower flange being shorter than the upper flange in a sliding direction of the grate member.

7. The device according to claim 1 wherein there is provided a fixed bar arranged to span across the discharge opening in proximity to a first end of the discharge opening, the grate member being arranged to overlap the fixed bar in the second position and being arranged to be spaced from the fixed bar towards a second end of the discharge opening opposite the first end in the first position.

8. The device according to claim 1 wherein the bars of the grate member are arranged to span across the discharge opening between opposing side edges of the grate member supported on pair of rails respectively, the bars of the grate member being adjustable in length such that a width of the grate member between the rails is adjustable.

9. The device according to claim 1 wherein there is provided at least one protrusion member supported on the grate member so as to be arranged to extend upwardly from the grate member beyond an uppermost surface of the bin floor.

10. The device according to claim 9 for use in a bin comprising a sweep auger supported above the bin floor and arranged to gather particulate material towards the discharge opening wherein said at least one protrusion member is supported on the grate member such that the sweep auger is arranged to rotate past the protrusion member.

11. The device according to claim 10 wherein said at least one protrusion member is supported on the grate member such that the protrusion member is movable between a working position extending upwardly from the grate member and a sweep position lowered in relation to the working position such that the sweep auger is arranged to rotate past the protrusion member.

12. The device according to claim 1 wherein the actuator is coupled to the grate member by a coupling which is selectively releasable.

13. The device according to claim 1 wherein the actuator is arranged to be supported below the bin floor.

14. The device according to claim 1 wherein the actuator comprises a pair of actuator members coupled to grate member at laterally spaced apart positions adjacent respective ones of the rails.

15. The device according to claim 1 for a bin comprising a discharge sump including a discharge auger extending in a longitudinal direction below the bin floor wherein the actuator is coupled to the grate member opposite the discharge auger.

16. The device according to claim 1 wherein the actuator comprises at least one actuator member comprising an air controlled piston cylinder coupled to the grate member and supported below the bin floor.

17. The device according to claim 16 wherein said at least one actuator member is controlled by a common controller arranged to be supported externally of the bin, said at least one actuator member being in communication with the common controller by air lines arranged to extend below the bin floor.

18. The device according to claim 1 wherein there is provided a retrofit frame member arranged to be received in the discharge opening in the bin floor, the pair of rails being supported along opposing sides of the retrofit frame member such that the grate member is supported on the retrofit frame member for relative sliding movement, and the actuator being supported on the retrofit frame member.

19. The device according to claim 18 wherein there is provided a cover member arranged to be supported on the retrofit frame member such that the cover member spans over the actuator substantially flush with the bin floor and such that the cover member is readily removable independently of the grate member.

* * * * *